United States Patent
Bang (10) Patent No.: US 6,825,869 B2
(45) Date of Patent: Nov. 30, 2004

(54) APPARATUS TO GENERATE LASER BEAM DETECT SIGNAL

(75) Inventor: Doo-jin Bang, Yongin (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/704,918

(22) Filed: Nov. 12, 2003

(65) Prior Publication Data

US 2004/0114029 A1 Jun. 17, 2004

(30) Foreign Application Priority Data

Dec. 12, 2002 (KR) ........................................ 2002-79034

(51) Int. Cl.[7] .............................................. G03G 21/14
(52) U.S. Cl. ..................................... 347/250; 347/235
(58) Field of Search ................................ 347/235, 250

(56) References Cited

U.S. PATENT DOCUMENTS 4,720,632 A * 1/1988 Kaneko ...................... 250/235
6,476,955 B1 * 11/2002 Yoshida ...................... 359/204

* cited by examiner

Primary Examiner—Huan Tran
(74) Attorney, Agent, or Firm—Staas & Halsey LLP (57) ABSTRACT

An apparatus to detect a laser beam at a predetermined location within a light scanning unit of an image forming apparatus in order to synchronize a start position at which an electrostatic latent image is formed on a surface of a photosensitive body is disclosed. The apparatus includes laser beam detection optics, which may be formed of either a single unit lens or a cluster of one or more lenses that are placed in close proximity of each other. The laser beam detection optics receives the laser beam directed in the direction of the photosensitive body at a predetermined location relative to the start position on the photosensitive body, redirects the received laser beam towards a sensor, and focuses the laser beam on the sensing area of the sensor. The close proximity of, or the fact that the laser beam detection optics, minimizes the possibility of misalignment during the assembly that may result in the improper focusing of the laser beam on the sensor sensing area.

20 Claims, 4 Drawing Sheets

APPARATUS TO GENERATE LASER BEAM DETECT SIGNAL

CROSS-REFERENCE TO RELATED APPLICATIONS

This application claims the priority of Korean Patent Application No. 2002-79034, filed Dec. 12, 2002, in the Korean Intellectual Property Office, the disclosure of which is incorporated herein by reference.

BACKGROUND OF THE INVENTION

1. Field of the Invention

The present invention generally relates to a light scanning apparatus for use in an image forming apparatus such as a printer, a facsimile machine, a copier, etc., and more particularly, to an apparatus to detect a laser beam, and to produce a laser beam detect signal that may be used to synchronize scanning operation of the image forming apparatus, which is capable of minimizing the dimension of the components and reducing performance degradation caused by the assembly deviations introduced in the fabricating and assembling processes, thereby enhancing the printing quality.

2. Description of the Related Art

Generally, a light scanning apparatus of an image forming apparatus such as a printer, a facsimile machine or a copier uses a light source that generates a beam of light, such as a laser beam, in order to form an electrostatic latent image on a photosensitive body, such as a photosensitive drum or a photosensitive belt.

The light scanning apparatus forms the electrostatic latent image on the photosensitive body by converting the laser beam from the light source, such as a semiconductor laser, into a parallel ray of light of a predetermined size through a collimator lens, leading the laser beam to a light deflector that rotates at a high speed, deflecting the direction of the laser beam at the light deflector and emitting the laser beam along a scanning line on the photosensitive body through a scanning lens such as an f-θ (f-theta) lens.

In order to precisely locate the starting location where the electrostatic latent image is to be first formed on the photosensitive body, i.e., the starting location of the laser beam scanning line, an apparatus to detect the laser beam at a certain predetermined location relative to the intended starting point of the scanning line is employed. The apparatus to detect the laser beam, generates a beam detect signal, which is used by the image forming apparatus to synchronize the timing of the laser beam firing, or the like, so that the scanning is started at the intended starting point.

Figure 1:
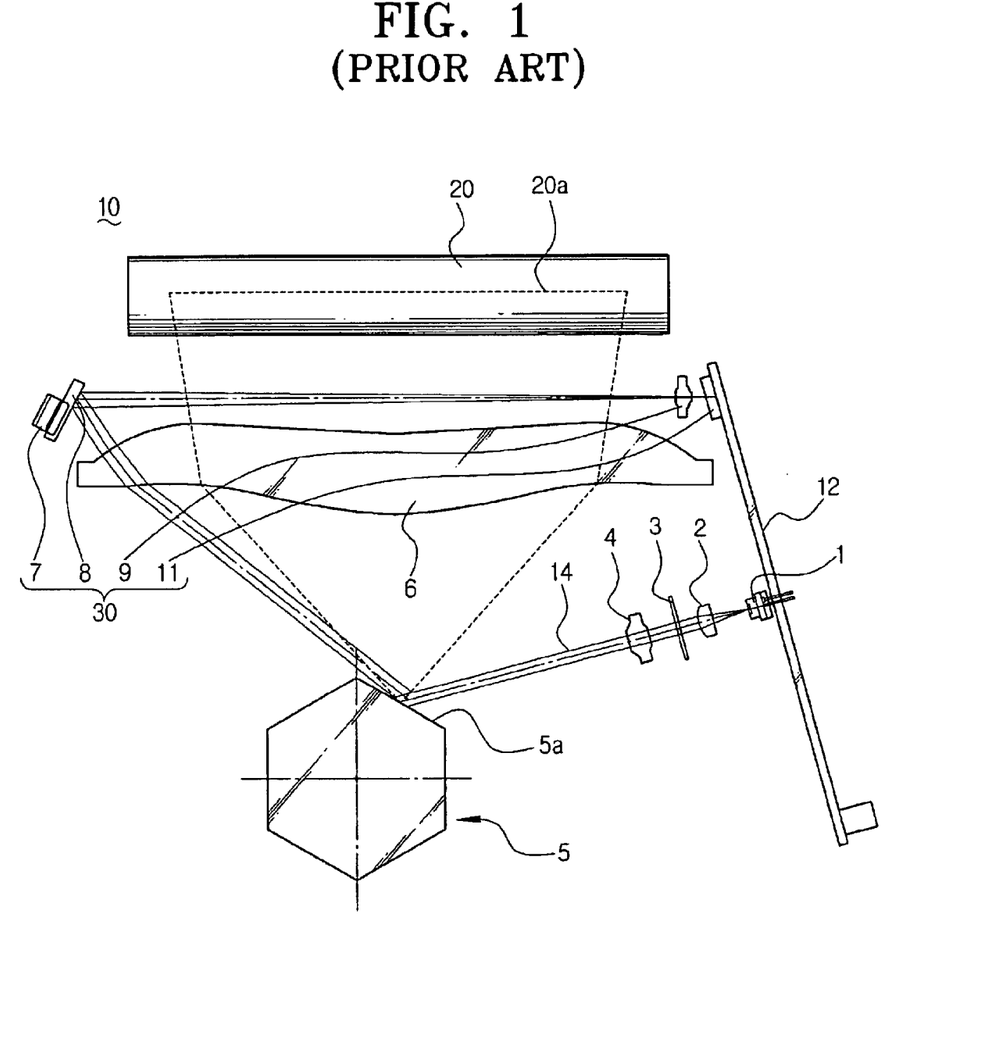
FIG. 1 is a schematic top plan view of a conventional light scanning apparatus.

FIG. 1 schematically shows a conventional light scanning apparatus 10 to form an electrostatic latent image on a photosensitive body.

Referring to FIG. 1, the light scanning apparatus 10 includes a semiconductor laser 1 emitting a laser beam 14, a collimator lens 2 arranged in correspondence with the semiconductor laser 1 to form the laser beam 14 into a parallel ray of light, a slit 3 through which the laser beam 14 which has passed through the collimator lens 2 is converted into a predetermined form, a cylindrical lens 4 through which the laser beam which has passed through the slit 3 is transformed into a linear light, and a light deflector 5 to deflect the laser beam 14. The light deflector 5 includes a rotary polygon mirror 5a supported on a spindle motor (not shown) to be rotatably driven at a given speed.

The light scanning apparatus 10 also includes an f-θ lens 6 that compensates for the error included in the laser beam 14 deflected from the rotary polygon mirror 5a, thereby emitting the laser beam 14 to a photosensitive drum 20. The beam detect signal generating part 30 generates a signal used by the image forming apparatus to correctly synchronize the formation location of the electrostatic latent image along a laser beam scanning line 20a, shown across the photosensitive drum 20.

The beam detect signal generating part 30 includes a reflective mirror 8 secured on a spring 7 on a portion of the optical path of the laser beam 14 that would not interfere with the scanning of the laser beam 14 along the length of the laser beam scanning line 20a. The reflective mirror 8 deflects the laser beam 14 in the direction of a laser beam detecting lens 9. The laser beam detecting lens 9 has an incident face and an emissive face which are spherical, cylindrical or plane surfaces to converge the laser beam 14 from the reflective mirror 8 onto a laser beam detecting sensor 11. The laser beam detecting sensor 11 may be a photo diode sensor, and upon detection of the laser beam 14, generates a beam detect signal. The laser beam detecting sensor 11 may be assembled either in a printed circuit board 12 (PCB), which also supports the semiconductor laser 1, or in a separate printed circuit board (not shown).

The operation of the conventional light scanning apparatus 10 will now be described.

In accordance with the input image signals, the laser beam 14 is emitted from the semiconductor laser 1, and converted into a parallel ray of light by the collimator lens 2. Then, after passing through the slit 3 that shapes the laser beam 14 in a predetermined form, the laser beam 14 is passed through the cylindrical lens 4, and then deflected by the deflecting faces of the polygon mirror 5a that is rotated at relatively high speed by the spindle motor.

Next, the laser beam 14 is made to selectively pass through the f-θ lens 6 to be converged on the photosensitive drum 20 in the form of a light spot, thereby scanning the scanning line 20a of a predetermined, effective scanning width along a main scanning direction as shown in FIG. 1. At this time, the photosensitive drum 20 is driven to rotate in a sub-scanning direction by a driving motor (not shown). Accordingly, as a result of the scanning movements of the light spots in the main scanning direction and the rotation of the photosensitive drum 20 in the sub-scanning direction, a predetermined electrostatic latent image is formed on the photosensitive drum 20.

In order to start each of the scanning lines 20a at the correct starting point, the laser beam 14 deflected from the rotary polygon mirror 5a is detected at a predetermined location either prior to the start of or past the end of the effective scanning width of the laser beam scanning line 20a. In the embodiment shown in FIG. 1, the beam detection is shown to be made at a location prior to the start of the scanning line 20a. The laser beam 14, which have passed through the f-θ lens 6, is deflected by the reflective mirror 8 placed at the predetermined location in the main scanning direction towards the laser beam detecting lens 9. When the laser beam 14 deflected by the reflective mirror 14 is received by the laser beam detecting sensor 11, the laser beam sensor 11 in response thereto produces a beam sensed signal. The beam sensed signal itself may be taken as the beam detect signal, or, in the alternative, is converted into suitable voltage and/or current, by a beam detect signal generation circuit (not shown), which may be disposed on the same PCB 12, to generate the beam detect signal.

The beam detect signal so generated is input to a controller unit (not shown), which controls the timings of both the scanning start and image formation of the light spots on the photosensitive drum 20. The controller uses the beam detect signal in order to determine the proper location for the scanning start.

However, the conventional light scanning apparatus 10 operated as above has a rather complex structure in which the reflective mirror 8 and the laser beam detecting lens 9 are separated by a relatively large distance in a narrow space in the light scanning apparatus 10. In addition, dimension and assembly deviations or errors are frequently generated during the process of fabricating and assembling the parts such as the reflective mirror 8, the laser beam detecting lens 9, and the laser beam detecting sensor 11.

When the errors occur during the fabrication and assembly, the center of the optical axis of the laser beam detecting lens 9 may not properly align with the reflective mirror 8, resulting in the laser beam 14 being irregularly incident on the laser beam detecting sensor 11. Accordingly, the detection location of the laser beam varies, and as a result, a constant printing quality is not guaranteed.

SUMMARY OF THE INVENTION

Accordingly, it is an aspect of the present invention to provide an apparatus to detect a laser beam detect signal in which without using a separate reflective mirror, a laser beam detecting lens such as a focusing lens has a function of a reflective mirror to minimize the dimension of the components and to reduce performance degradation caused by the assembly deviations introduced in the fabricating and assembly processes, thus enhancing the printing quality.

It is another aspect of the present invention to provide an apparatus to detect a laser beam detect signal that can reduce the number of parts to allow the fabrication process to become simpler, thereby decreasing the fabrication costs.

Additional aspects and advantages of the invention will be set forth in part in the description which follows and, in part, will be obvious from the description, or may be learned by practice of the invention.

The foregoing and/or other aspects are achieved by providing an apparatus for generating a laser beam detection signal in a light scanning unit that causes a laser beam to be scanned across a surface of a photosensitive body of an image forming device to form an electrostatic latent image on the photosensitive body, the laser beam being scanned across the surface of the photosensitive body in at least one scanning line that has a beginning point and an end point, the laser beam detection signal being used by the image forming apparatus to control the light scanning unit so that the beginning point occurs at a desired location, the laser scanning unit including at least a laser source and means for directing the laser beam emanating from the laser source towards a range of locations, the apparatus comprising: a laser beam detecting sensor disposed at a sensor location that falls outside the range of locations; and a single integrated optical element disposed at a predetermined location that falls within the range of locations, the single integrated optical element being arranged to receive the laser beam from the directing means, to deflect the received laser beam towards the laser beam detecting sensor, and to focus the deflected laser beam on the laser beam detecting sensor, the laser beam detecting sensor in response to the laser beam being focused thereon producing a signal indicative of the laser beam being detected at the predetermined location.

The single integrated optical component may comprise a first face having a reflective surface formed thereon; and a second face having an incident surface and an emissive surface formed thereon, the incident surface having a first shape to direct laser beam received from the directing means to the reflective surface at an incident angle, and the emissive surface having a second shape to focus the laser beam reflected from the reflective surface on a sensing area of the laser beam detecting sensor.

The reflective surface may have at least one of a planar shape and a cylindrical shape, and the first shape and the second shape may be at least one of a spherical shape and a cylindrical shape.

The predetermined location may be located at an upstream of the beginning point of the at least one scanning line along the range of locations such that the laser beam received from the directing means is received by the single integrated optical element prior to the laser beam being incident on the beginning point of the at least one scanning line.

The sensor location may be located at an opposite side of the at least one scanning line from the predetermined location.

The foregoing and/or other aspects may also be achieved by providing an apparatus for generating a laser beam detection signal in a light scanning unit that causes a laser beam to be scanned across a surface of a photosensitive body of an image forming device to form an electrostatic latent image on said photosensitive body, the laser beam being scanned across the surface of the photosensitive body in at least one scanning line that has a beginning point and an end point, the laser beam detection signal being used by the image forming apparatus to control the light scanning unit so that the beginning point occurs at a desired location, the laser scanning unit including at least a laser source and means for directing the laser beam emanating from the laser source towards the photosensitive body, the apparatus comprising: a laser beam detecting sensor; and one or more closely arranged optical element clustered together at a predetermined location that is at least one of a first predetermined location and a second predetermined location, the first predetermined location being upstream of the beginning point of the at least one scanning line such that the laser beam received from the directing means is received by at least one member of the one or more closely arranged optical element prior to the laser beam being incident on the beginning point of the at least one scanning line, the second predetermined location being downstream of the end point of said at least one scanning line such that the laser beam received from the directing means is received by at least one member of the one or more closely arranged optical element after to the laser beam being incident on the end point of said at least one scanning line, the one or more closely arranged optical element being configured to receive the laser beam from the directing means, to deflect the received laser beam towards the laser beam detecting sensor, and to focus the deflected laser beam on the laser beam detecting sensor, the laser beam detecting sensor in response to the laser beam being focused thereon producing a signal indicative of the laser beam being detected at the predetermined location.

The one or more closely arranged optical element may comprise a single integrated optical element having a first face having a reflective surface formed thereon and a second face having an incident surface and an emissive surface formed thereon, the incident surface having a first shape to direct laser beam received from the directing means to the reflective surface at an incident angle, and the emissive surface having a second shape to focus the laser beam reflected from the reflective surface on a sensing area of the laser beam detecting sensor.

The reflective surface may have at least one of a planar shape and a cylindrical shape, and the incident surface and the emissive surface may have at least one of a spherical shape and a cylindrical shape.

The foregoing and/or other aspects may also be achieved by providing a light scanning unit for scanning a laser beam across a surface of a photosensitive body of an image forming device to form an electrostatic latent image on the photosensitive body, comprising: a laser source for generating the laser beam; means for directing the laser beam emanating from the laser source towards a range of locations, at least a portion of the range of locations being at least one scanning line across the surface of the photosensitive body, the at least one scanning line having a beginning point and an end point; a laser beam detecting sensor mounted in the light scanning unit at a sensor location that falls outside the range of locations; and one or more closely arranged optical element clustered together at a predetermined location that falls within the range locations, the predetermined location being at least one of a first predetermined location and a second predetermined location, the first predetermined location being upstream of the beginning point of the at least one scanning line such that the laser beam received from the directing means is received by at least one member of the one or more closely arranged optical element prior to the laser beam being incident on the beginning point of the at least one scanning line, the second predetermined location being downstream of the end point of the at least one scanning line such that the laser beam received from the directing means is received by at least one member of the one or more closely arranged optical element after to the laser beam being incident on the end point of the at least one scanning line, the one or more closely arranged optical element being configured to receive the laser beam from the directing means, to deflect the received laser beam towards the laser beam detecting sensor, and to focus the deflected laser beam on the laser beam detecting sensor, the laser beam detecting sensor in response to the laser beam being focused thereon producing a signal indicative of the laser beam being detected at the predetermined location.

The one or more closely arranged optical element may comprise a single integrated optical element having a first face having a reflective surface formed thereon and a second face having an incident surface and an emissive surface formed thereon, the incident surface having a first shape to direct laser beam received from the directing means to the reflective surface at an incident angle, and the emissive surface having a second shape to focus the laser beam reflected from the reflective surface on a sensing area of the laser beam detecting sensor.

The sensor location may be near the first predetermined location if said one ore more closely arranged optical element is positioned at the second predetermined location, and be near the second predetermined location if the one or more closely arranged optical component is positioned at the first predetermined location.

The reflective surface may have at least one of a planar and a cylindrical shape, and the incident surface and the emissive surface may have at least one of a spherical and a cylindrical shape. The reflective surface may be formed of a reflective film formed on the first face, or a mirror member attached to the first face.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
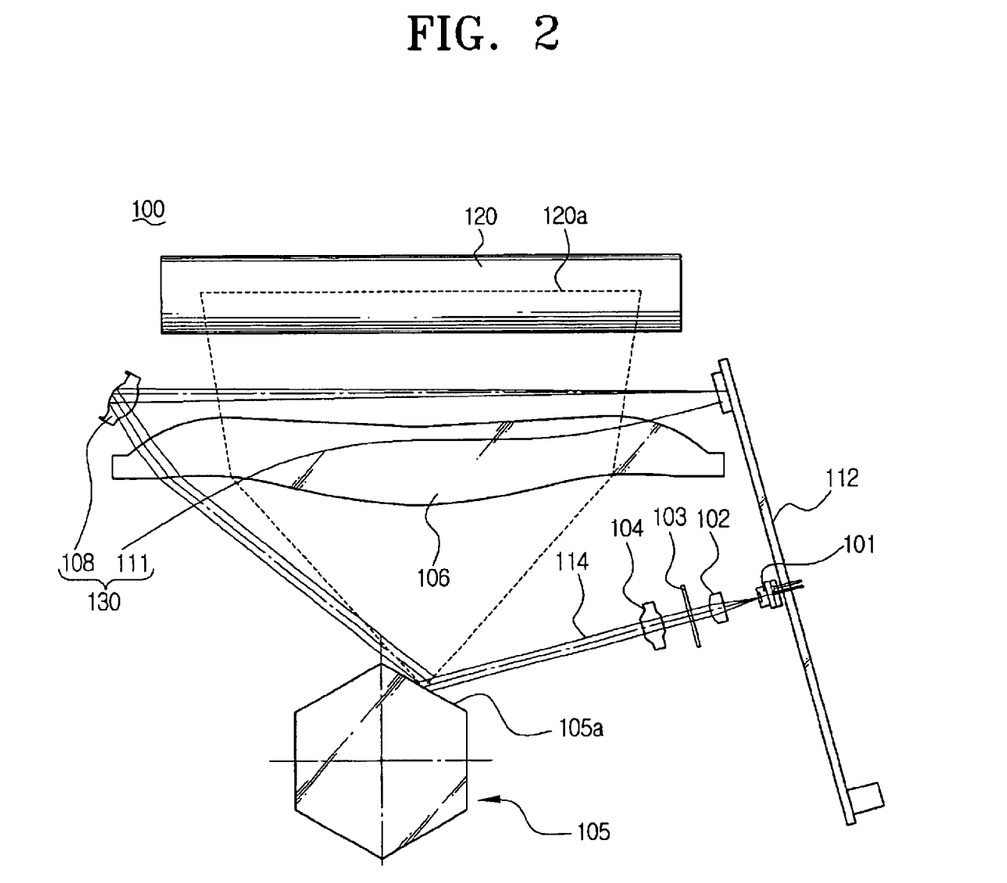
FIG. 2 is a schematic top plan view of an illustrative exemplary embodiment of a light scanning apparatus having an apparatus to generate a beam detect signal according to the principles of the present invention.

FIG. 2 shows a light scanning apparatus 100 having an apparatus 130 for generating a beam detect signal according to an embodiment of the present invention.

The light scanning apparatus 100 includes a semiconductor laser 101 emitting a light beam, such as a laser beam 114, a collimator lens 102 forming a parallel ray of light, a slit 103 converting the laser beam 114 into a predetermined form, a cylindrical lens 104 transforming the laser beam 114 into a linear light, a light deflector 105 deflecting the direction of the laser beam 114, and a scanning lens 106 such as an f-θ lens compensating for errors included in the laser beam 114 and to emit the laser beam to the photosensitive drum 120.

A description of the construction of the above elements will be omitted here, since these elements are similar to those of the conventional apparatus previously described above.

An apparatus 130 to generate a beam detect signal according to an embodiment of the present invention includes a focusing lens 108 disposed along a path of the laser beam 114 at a predetermined location relative to the photosensitive body 120. The focusing lens 108 forms a laser beam detecting path, deflects the laser beam 114 received from the light deflector 105 towards, and focuses the same on, a laser beam detecting sensor 111. The laser beam detecting sensor 111 upon detecting the laser beam 114 reflected from the focusing lens 108 causes a beam detect signal to be generated. A controller (not shown) uses the beam detect signal to synchronize the start position of the laser beam scanning line 120a. The laser beam detecting sensor 111 may be supported on a PCB 112.

In the embodiment shown in FIG. 2, the focusing lens 108 is arranged between the scanning lens 106 and the photosensitive drum 120. Accordingly, the semiconductor laser 101, the collimator lens 102, the slit 103, the cylindrical lens 104, the light deflector 105, the scanning lens 106, and the laser beam detecting sensor 111 form the laser beam detecting path together with the focusing lens 108.

Figure 3:
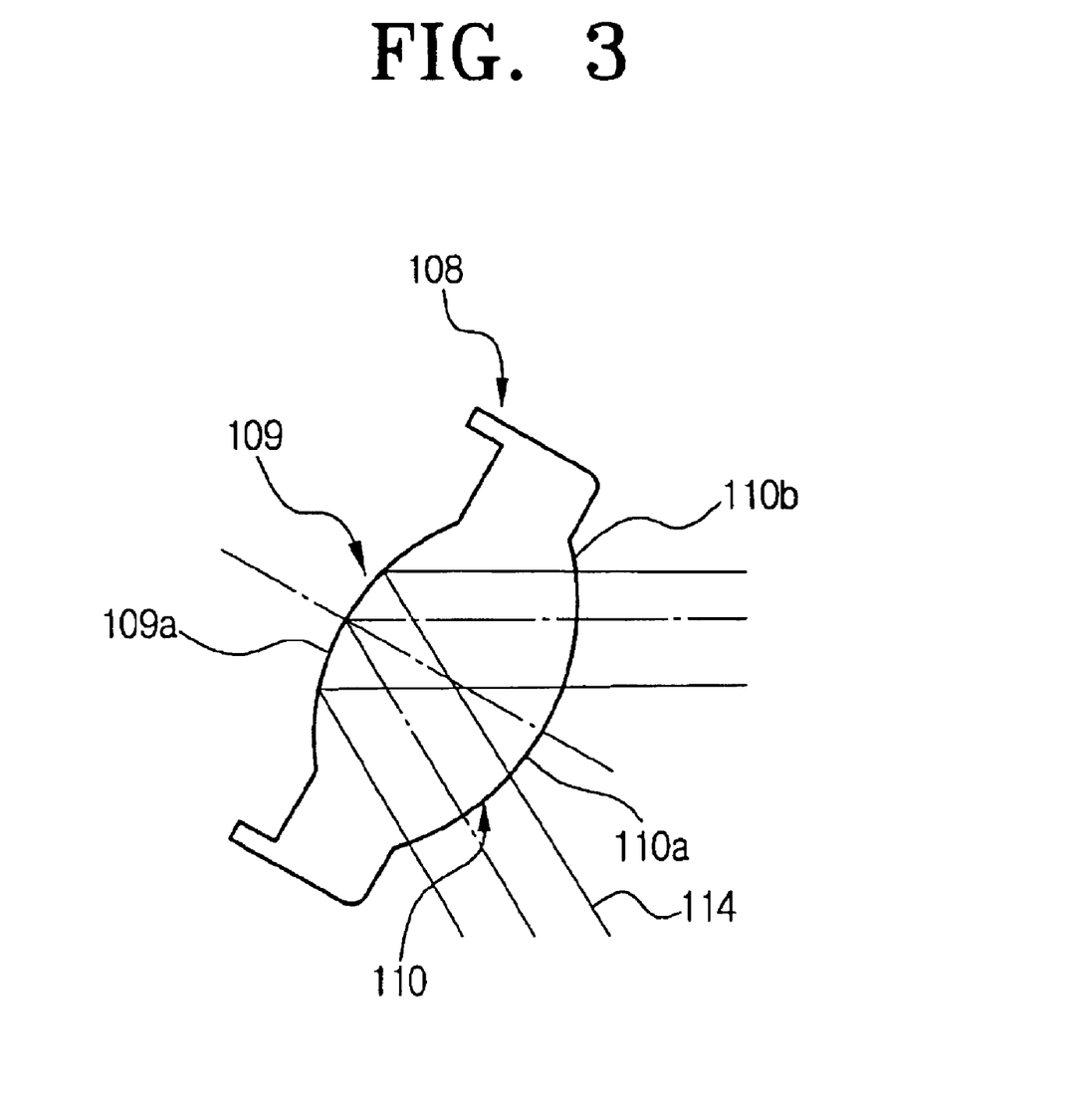
FIG. 3 is a top plan view of an illustrative exemplary embodiment of a focusing lens that may be employed in an apparatus to generate a beam detect signal according to the principles of the present invention.

As shown in FIG. 3, the focusing lens 108 has a first face 109 having a reflective surface 109a formed thereon to reflect the laser beam 114, and a second face 110 having an incident surface 110a and an emissive surface 110b formed thereon. The incident surface 110a leads a portion of the laser beam 114, to the reflective surface 109a, whereas the emissive surface 110b emits the laser beam 114 reflected from the reflective surface 109a toward a sensing area of the laser beam detecting sensor 111.

The incident surface 110a and the emissive surface 110b may be formed of a spherical shape or a cylindrical shape, and the reflective surface 109a may be formed of a plane shape or a cylindrical shape.

Accordingly, the shape of the incident surface 110a/reflective surface 109a/emissive surface 110b of the focusing lens 108 is formed of a combination of spherical shape/cylindrical shape/spherical shape, spherical shape/plane shape/spherical shape, cylindrical shape/cylindrical shape/cylindrical shape, or cylindrical shape/plane shape/cylindrical shape.

The reflective surface 109a can be formed on the first face 109 of the focusing lens 108 by depositing or attaching a reflective film in the form of a membrane, or attaching a separate mirror member, after machining the first face 109 of the focusing lens 108 into an appropriate shape.

According to a preferred embodiment, in the focusing lens 108 of the apparatus 130, the first face 109 and the second face 110 of the focusing lens 108 are shown as an integrally formed single unit. However, in an alternative embodiment, the focusing lens 108 may comprise two or more optical elements placed in close proximity to one another such that the distances between the two respective adjacent elements is not susceptible to the level of alignment deviation that were possible in the conventional light scanning apparatus earlier discussed.

For example, according to an alternative embodiment of the present invention, the focusing lens 108 may comprise two optical components, first one of which including the first face 109, and the other including the second face 110. The two optical components may be arranged to abut each other. In other words, in this embodiment, the focusing lens 108 shown in FIG. 3, may be divided or split into two components along a line perpendicular to the optical axis of the focusing lens 108, and is the optical components can be arranged to abut each other while their optical axis is aligned.

In another alternative embodiment, the focusing lens 108 shown in FIG. 3, may be divided or split into two or more components, and all of the optical elements are arranged in close proximity of one another so that the group of optical elements that together make up the focusing lens 108 are disposed on the same side of the laser beam scanning line 120a, i.e., all of the optical elements in the group are placed either prior to the start of the laser beam scanning line 120a or after the end of the laser beam scanning line 120a in close proximity to one another. Due to the closeness of the reflective surface 109a to the second face 110, deviations in the assembling process can be minimized, thereby preventing degraded printing quality.

Moreover, while the preferred embodiment shown in FIG. 3 illustrates three surfaces, namely, the reflective surface 109a, incident surface 110a, and the emissive surface 110b, to perform the functions of receiving, reflectively deflecting towards the laser beam detecting sensor 111, and focusing the laser beam 114 onto the sensing area of the laser beam detecting sensor 111, respectively, the three functions may be accomplished by a single concave surface having an appropriate reflective quality and curvature of radius R, which allows the laser beam 114 to be incident on the concave surface, and be deflected towards, and focused onto, the sensing area of the laser beam detecting sensor 111.

In addition, the preferred embodiment of FIG. 2 shows the focusing lens 108 being located before the starting point of the laser beam scanning line 120a, however, the focusing lens may placed anywhere along the scanning path of the laser beam 114 so long as such placement does not interfere with the laser beam 114 being scanned across the laser beam scanning line 120a.

The laser beam detecting sensor 111, which may be a photo diode sensor, is fixed on the PCB 112 on which the semiconductor laser 101 generating the laser beam 114 may be disposed as the light source.

Alternatively, the laser beam detecting sensor 111 can be supported on a separate holder (not shown) or a separate PCB (not shown), instead of the PCB 112.

The operation of the apparatus 130 according to the preferred embodiment will now be explained below with reference to FIGS. 2 and 3.

First, when the laser beam 114 is emitted from the semiconductor laser 101 and then deflected by the deflecting faces of a polygon mirror 105a via the collimator lens 102, the slit 103, and the cylindrical lens 104, the laser beam 114 from the polygon mirror 105a becomes incident with a predetermined incident angle on the incident surface 110a of the focusing lens 108 via the scanning lens 106.

Next, the laser beam 114 incident on the incident surface 110a is refracted in a predetermined refraction index according to the shape of the incident surface 110a, and guided to the reflective surface 109a.

At the reflective surface 109a, the laser beam 114 is reflected at an angle symmetrical to the incident angle of the laser beam 114 to the reflective surface 109a, and is refracted by a predetermined refraction index corresponding to the shape of the emissive surface 110b through the emissive surface 110b to be converged in the direction of the laser beam detecting sensor 111. It should be apparent to, and readily understood by, one skilled in the art that the respective curvatures of the incident surface 110a and the emissive surface 110b may be identical, or may vary significantly from one to the other depending on the relative location of the focusing lens 108 with respect to the polygon mirror 105 and to the laser beam detecting sensor 111.

Thereafter, the laser beam 114 is focused onto the sensing area of the laser beam detecting sensor 111 supported on the PCB 112.

The laser beam detecting sensor 111, upon receiving the laser beam 114, either by itself or in conjunction with additional circuitry, sends a beam detect signal, which is sent to a controller (not shown) that controls the timing of both the scanning start and image formation of the light spots on the photosensitive drum 120.

Figure 4:
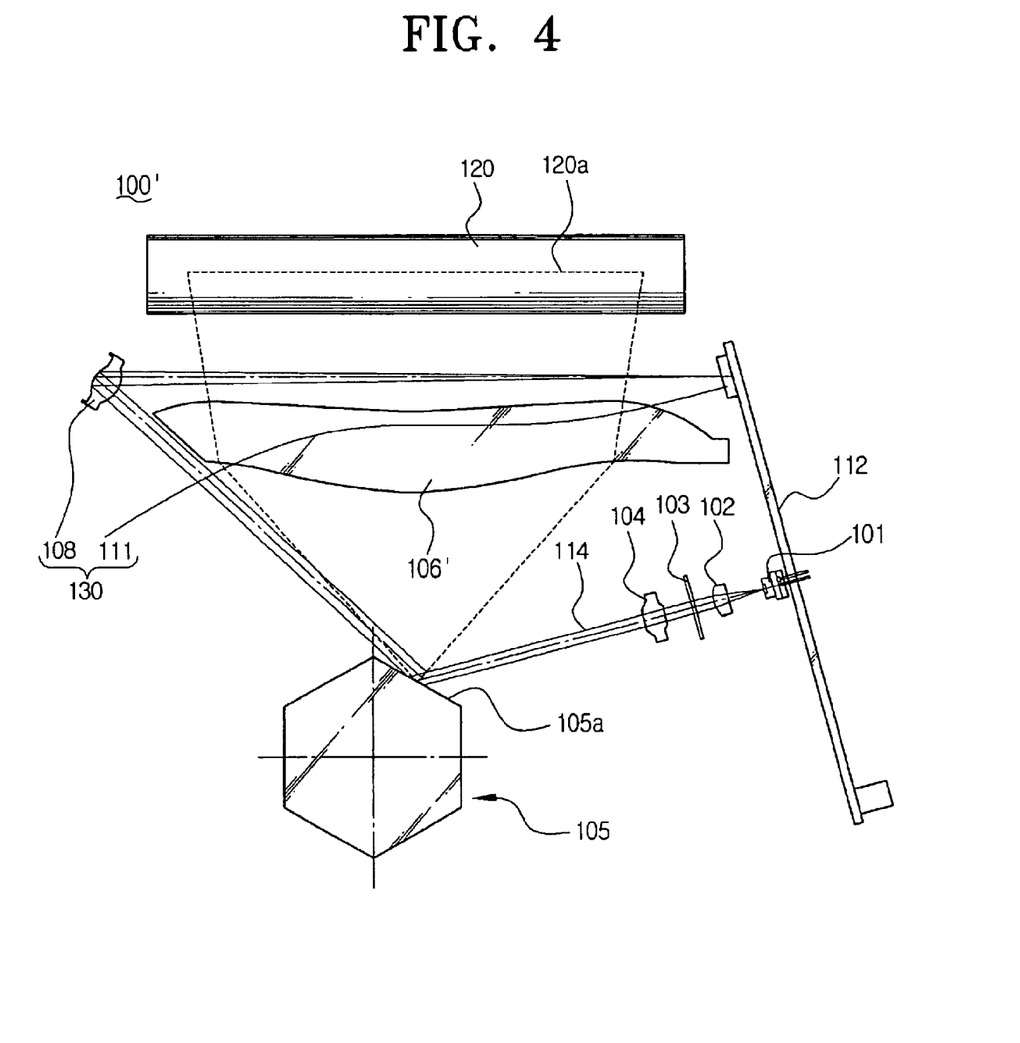
FIG. 4 is a schematic top plan view of another illustrative exemplary embodiment of a light scanning apparatus according to the principles of the present invention.

FIG. 4 shows yet another embodiment of the light scanning apparatus 100' having the apparatus 130 to generate the beam detect signal.

The light scanning apparatus 100' is identical to that of the light scanning apparatus 100 shown in FIG. 2 except that the focusing lens 108 has a modified scanning lens 106' to directly reflect the laser beam 114 from the light deflector 105 to the focusing lens 108, rather than through the scanning lens 106 as shown in FIG. 2.

In the light scanning apparatus 100', the semiconductor laser 101, the collimator lens 102, the slit 103, the cylindrical lens 104, the light deflector 105, and the laser beam detecting sensor 111 form a laser beam detecting path together with the focusing lens 108.

As is apparent from the forgoing description, according to the embodiments of the present invention, the focusing lens according to the principles of the present invention does not require the reflective optical component to be at a great distance from another optical element in order to focus the laser beam onto the sensing area of the laser beam detect sensor, thus minimizing the possible assembly deviations in the assembling process, and thereby guaranteeing printing quality. In the preferred embodiment, in which a single unit optical element is used as the focusing lens, since the number of parts is reduced, the fabrication process becomes simpler and the fabrication costs may decrease.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. An apparatus for generating a laser beam detection signal in a light scanning unit that causes a laser beam to be scanned across a surface of a photosensitive body of an image forming device to form an electrostatic latent image on said photosensitive body, said laser beam being scanned across said surface of said photosensitive body in at least one scanning line that has a beginning point and an end point, said laser beam detection signal being used by said image forming apparatus to control said light scanning unit so that said beginning point occurs at a desired location, said laser scanning unit including at least a laser source and means for directing said laser beam emanating from said laser source towards a range of locations, said apparatus comprising:

a laser beam detecting sensor disposed at a sensor location that falls outside said range of locations; and a single integrated optical element disposed at a predetermined location that falls within said range of locations, said single integrated optical element being arranged to receive said laser beam from said directing means, to deflect said received laser beam towards said laser beam detecting sensor, and to focus said deflected laser beam on said laser beam detecting sensor, said laser beam detecting sensor in response to said laser beam being focused thereon producing a signal indicative of said laser beam being detected at said predetermined location.

2. The apparatus according to claim 1, wherein the single integrated optical component comprises:

a first face having a reflective surface formed thereon; and a second face having an incident surface and an emissive surface formed thereon, the incident surface having a first shape to direct laser beam received from said directing means to the reflective surface at an incident angle, and the emissive surface having a second shape to focus the laser beam reflected from the reflective surface on a sensing area of the laser beam detecting sensor.

3. The apparatus according to claim 2, wherein the reflective surface has at least one of a planar shape and a cylindrical shape.

4. The apparatus according to claim 2, wherein the first shape is at least one of a spherical shape and a cylindrical shape.

5. The apparatus according to claim 2, wherein the second shape is at least one of a spherical shape and a cylindrical shape.

6. The apparatus according to claim 1, wherein said predetermined location is located at an upstream of said beginning point of said at least one scanning line along said range of locations such that the laser beam received from said directing means is received by said single integrated optical element prior to said laser beam being incident on said beginning point of said at least one scanning line.

7. The apparatus according to claim 6, wherein said sensor location is located at an opposite side of said at least one scanning line from said predetermined location.

8. An apparatus for generating a laser beam detection signal in a light scanning unit that causes a laser beam to be scanned across a surface of a photosensitive body of an image forming device to form an electrostatic latent image on said photosensitive body, said laser beam being scanned across said surface of said photosensitive body in at least one scanning line that has a beginning point and an end point, said laser beam detection signal being used by said image forming apparatus to control said light scanning unit so that said beginning point occurs at a desired location, said laser scanning unit including at least a laser source and means for directing said laser beam emanating from said laser source towards said photosensitive body, said apparatus comprising:

a laser beam detecting sensor; and one or more closely arranged optical element clustered together at a predetermined location that is at least one of a first predetermined location and a second predetermined location, said first predetermined location being upstream of said beginning point of said at least one scanning line such that the laser beam received from said directing means is received by at least one member of said one or more closely arranged optical element prior to said laser beam being incident on said beginning point of said at least one scanning line, said second predetermined location being downstream of said end point of said at least one scanning line such that the laser beam received from said directing means is received by at least one member of said one or more closely arranged optical element after to said laser beam being incident on said end point of said at least one scanning line, said one or more closely arranged optical element being configured to receive said laser beam from said directing means, to deflect said received laser beam towards said laser beam detecting sensor, and to focus said deflected laser beam on said laser beam detecting sensor, said laser beam detecting sensor in response to said laser beam being focused thereon producing a signal indicative of said laser beam being detected at said predetermined location.

9. The apparatus according to claim 8, wherein:

said one or more closely arranged optical element comprises a single integrated optical element having a first face having a reflective surface formed thereon and a second face having an incident surface and an emissive surface formed thereon, the incident surface having a first shape to direct laser beam received from said directing means to the reflective surface at an incident angle, and the emissive surface having a second shape to focus the laser beam reflected from the reflective surface on a sensing area of the laser beam detecting sensor.

10. The apparatus according to claim 9, wherein the reflective surface has at least one of a planar shape and a cylindrical shape.

11. The apparatus according to claim 9, wherein the incident surface has at least one of a spherical shape and a cylindrical shape.

12. The apparatus according to claim 9, wherein the emissive surface has at least one of a spherical shape and a cylindrical shape.

13. A light scanning unit for scanning a laser beam across a surface of a photosensitive body of an image forming device to form an electrostatic latent image on said photosensitive body, comprising:

a laser source for generating said laser beam;

means for directing said laser beam emanating from said laser source towards a range of locations, at least a portion of said range of locations being at least one scanning line across said surface of said photosensitive body, said at least one scanning line having a beginning point and an end point;

a laser beam detecting sensor mounted in said light scanning unit at a sensor location that falls outside said range of locations; and     one or more closely arranged optical element clustered together at a predetermined location that falls within said range locations, said predetermined location being at least one of a first predetermined location and a second predetermined location, said first predetermined location being upstream of said beginning point of said at least one scanning line such that the laser beam received from said directing means is received by at least one member of said one or more closely arranged optical element prior to said laser beam being incident on said beginning point of said at least one scanning line, said second predetermined location being downstream of said end point of said at least one scanning line such that the laser beam received from said directing means is received by at least one member of said one or more closely arranged optical element after to said laser beam being incident on said end point of said at least one scanning line, said one or more closely arranged optical element being configured to receive said laser beam from said directing means, to deflect said received laser beam towards said laser beam detecting sensor, and to focus said deflected laser beam on said laser beam detecting sensor, said laser beam detecting sensor in response to said laser beam being focused thereon producing a signal indicative of said laser beam being detected at said predetermined location.

14. The light scanning unit according to claim 13, wherein:

said one or more closely arranged optical element comprises a single integrated optical element having a first face having a reflective surface formed thereon and a second face having an incident surface and an emissive surface formed thereon, the incident surface having a first shape to direct laser beam received from said directing means to the reflective surface at an incident angle, and the emissive surface having a second shape to focus the laser beam reflected from the reflective surface on a sensing area of the laser beam detecting sensor.

15. The light scanning unit according to claim 13, wherein:

said sensor location is near said first predetermined location if said one or more closely arranged optical element is positioned at said second predetermined location, and is near said second predetermined location if said one or more closely arranged optical component is positioned at said first predetermined location.

16. The light scanning unit according to claim 14, wherein the reflective surface has at least one of a planar and a cylindrical shape.

17. The light scanning unit according to claim 14, wherein the incident surface has at least one of a spherical and a cylindrical shape.

18. The light scanning unit according to claim 14, wherein the emissive surface has at least one of a spherical and a cylindrical shape.

19. The light scanning unit according to claim 14, wherein the reflective surface comprises a reflective film formed on the first face.

20. The light scanning unit according to claim 14, wherein the reflective surface comprises a mirror member attached to the first face.

* * * * *